US007157177B2

(12) United States Patent
Chan

(10) Patent No.: US 7,157,177 B2
(45) Date of Patent: Jan. 2, 2007

(54) POROUS FUEL CELL ELECTRODE STRUCTURES HAVING CONFORMAL ELECTRICALLY CONDUCTIVE LAYERS THEREON

(75) Inventor: Chung M. Chan, Bellevue, WA (US)

(73) Assignee: Neah Power Systems, Inc., Bothell, WA (US)

( * ) Notice: Subject to any disclaimer, the term of this patent is extended or adjusted under 35 U.S.C. 154(b) by 269 days.

(21) Appl. No.: 10/336,162

(22) Filed: Jan. 3, 2003

(65) Prior Publication Data

US 2003/0194598 A1  Oct. 16, 2003

Related U.S. Application Data

(60) Provisional application No. 60/372,903, filed on Apr. 15, 2002, provisional application No. 60/345,011, filed on Jan. 3, 2002.

(51) Int. Cl.
*H01M 4/86* (2006.01)
(52) U.S. Cl. .......................... 429/44; 429/40; 427/488; 427/576
(58) Field of Classification Search .................. 429/44, 429/40; 427/488, 576
See application file for complete search history.

(56) References Cited

U.S. PATENT DOCUMENTS

| 4,874,484 | A | | 10/1989 | Foell et al. | |
|---|---|---|---|---|---|
| 5,483,919 | A | | 1/1996 | Yokoyama et al. | ........... 117/89 |
| 5,543,239 | A | | 8/1996 | Virkar et al. | |
| 5,672,439 | A | * | 9/1997 | Wilkinson et al. | ............ 429/40 |
| 5,964,991 | A | | 10/1999 | Kawasaki et al. | |
| 6,015,590 | A | | 1/2000 | Suntola et al. | ......... 427/255.23 |
| 6,037,073 | A | | 3/2000 | Besmann et al. | ............. 429/34 |
| 6,042,652 | A | | 3/2000 | Hyun et al. | .................. 118/719 |
| 6,143,659 | A | | 11/2000 | Leem | ......................... 438/688 |
| 6,171,720 | B1 | | 1/2001 | Besmann et al. | ............. 429/39 |
| 6,174,809 | B1 | | 1/2001 | Kang et al. | .................. 438/682 |
| 6,203,613 | B1 | | 3/2001 | Gates et al. | ................. 117/104 |
| 6,297,185 | B1 | | 10/2001 | Thompson et al. | |

(Continued)

FOREIGN PATENT DOCUMENTS

DE          19820756      *  5/1998

(Continued)

OTHER PUBLICATIONS

Utriainen, Mikko et al., "Studies of metallic thin film growth in an atomic layer epitaxy reactor using M(acac)$_2$ (M=Ni, Cu, Pt) precursors." *Applied Surface Science* 157 (2000) 151-158.

(Continued)

*Primary Examiner*—Mark Ruthkosky
(74) *Attorney, Agent, or Firm*—Thomas E. Loop

(57) ABSTRACT

The present invention discloses porous fuel cell electrode structures, assemblies, and systems having one or more conformal metallic layers selectively deposited on one or more pore surfaces, as well as to various methods relating thereto. In one embodiment, the present invention is directed to an electrode structure adapted for use with a fuel cell system (e.g., a hydrogen or a direct hydrocarbon fuel cell system), wherein the electrode structure comprises a substrate or support structure having one or more discrete porous bulk matrix regions disposed across a top surface of the substrate. In this embodiment, each of the one or more discrete porous bulk matrix regions is defined by a plurality of acicular pores that extend through the substrate or support structure. The plurality of acicular pores define inner pore surfaces, and the inner pore surfaces have a conformal electrically conductive layer thereon, as well as a plurality of catalyst particles.

13 Claims, 9 Drawing Sheets

U.S. PATENT DOCUMENTS

| | | |
|---|---|---|
| 6,342,277 B1 | 1/2002 | Sherman ..................... 427/562 |
| 6,355,561 B1 | 3/2002 | Sandhu et al. .............. 438/676 |
| 6,399,236 B1 | 6/2002 | Furuya |
| 6,403,245 B1* | 6/2002 | Hunt ........................... 429/33 |
| 6,426,126 B1* | 7/2002 | Conover et al. ............ 427/488 |
| 6,541,149 B1* | 4/2003 | Maynard et al. .............. 429/40 |
| 6,558,770 B1* | 5/2003 | Lehmann et al. ........... 428/138 |
| 6,638,654 B1 | 10/2003 | Jankowksi et al. |
| 6,641,948 B1* | 11/2003 | Ohlsen et al. ................. 429/44 |
| 6,720,105 B1* | 4/2004 | Ohlsen et al. ................. 429/41 |
| 6,808,840 B1* | 10/2004 | Mallari et al. ................. 429/44 |
| 6,811,916 B1* | 11/2004 | Mallari et al. ................. 429/36 |
| 2002/0182479 A1* | 12/2002 | Mallari et al. ................. 429/44 |
| 2002/0197522 A1 | 12/2002 | Lawrence et al. ............ 429/34 |
| 2003/0003347 A1 | 1/2003 | D'Arrigo et al. |
| 2003/0039874 A1 | 2/2003 | Jankowski et al. |
| 2003/0082431 A1 | 5/2003 | Klitsner et al. |
| 2003/0170524 A1 | 9/2003 | Kordesch et al. |

FOREIGN PATENT DOCUMENTS

| | | |
|---|---|---|
| WO | WO 00/45457 | 8/2000 |
| WO | WO 00/69007 | 11/2000 |
| WO | WO 01/39307 A2 | 5/2001 |

OTHER PUBLICATIONS

Utriainen, Mikko et al., "Porous silicon host matrix for deposition by atomic layer epitaxy." *Thin Solid Films* 297 (1997) 39-42.

Lakomaa, Eeva-Liisa, "Atomic layer epitaxy (ALE) on porous substrates." *Applied Surface Science* 75 (1994) 185-196.

Düsco, et al., "Deposition of Tin Oxide into Porous Silicon by Atomic Layer Epitaxy," *J. Electrochem. Soc.*, 143 (2): 683-687, Feb. 1996.

Aarik, Jaan et al., "Characterization of titanium dioxide atomic layer growth from titanium ethoxide and water." *Thin Solid Films* 370 (2000) 163-172.

Sammelselg, V. et al., "TiO$_2$ thin films by atomic layer deposition: a case of uneven growth at low temperature." *Applied Surface Science* 134 (1998) 78-86.

Imai, Shigeru et al., "Atomic layer epitaxy of Si using atomic H." *Thin Solid Films* 225 (1993) 168-172.

Niinisto, Lauri et al., "Synthesis of oxide thing films and overlayers by atomic layer epitaxy for advanced applications." *Materials Science and Engineering* B41 (1996) 23-29.

Ritala, Mikko & Markku Leskela, "Atomic layer epitaxy—a valuable tool for nanotechnology?" *Nanotechnology* 10 (1999) 19-24.

Matero, Raija et al., "Effect of water dose on the atomic layer deposition rate of oxide thin films." *Thin Solid Films* 368 (2000) 1-7.

Suntola, Tuomo, "Surface chemistry of materials deposition at atomic layer level." *Applied Surface Science* 100/101 (1996) 391-398.

Yamada, Akira et al., "Atomic layer deposition of ZnO transparent conducting oxides." *Applied Surface Science* 112 (1997) 216-222.

Matsui, Yuichi et al., "Growth Mechanism of Ru Films Prepared by Chemical Vapor Deposition Using Bis(ethylcyclopentadientyl)ruthenium Precursor." *Electrochemical and Solid State Letters* 4 (2) C9-C12 (2001).

Park, Song-Eon et al., "RuO$_2$ thin film fabrication with plasma-enhanced chemical vapor deposition." *Thin Solid Flims* 341 (1999) 52-54.

Fang, Q.L. et al., "Ruthenium Oxide Film Electrodes Prepared at Low Temperatures for Electrochemical Capacitors." *Journal of the Electrochemical Society* 148 (8) A833-A837 (2001).

Suntola, T. and M. Simpson, "Atomic Layer Epitaxy." Blackie and Son Ltd., Glasgow, 1990.

Aylett et al., "Metallisation of Porous Silicon by Chemical Vapour Infiltration and Deposition." *Thin Solid Films* 276 (1996) 253-256.

Kukli, Kaupo et al., "Influence of Atomic Layer Deposition Parameters on the Phase Content of Ta$_2$0$_5$ Films." *J. Crystal Growth* 212 (2000) 459-468.

Braun, Alexander, E., "ALD Breaks Materials, Conformality Barriers." Semiconductor International Online website, http://www.e-insite.net/semiconductor/index.asp_layout=articlePrint&articleID=CA164276, Oct. 1, 2001.

Sherman, Arthur, "Atomic Layer Deposition." UC Berkeley Extension, http://ww.unex.berkeley.edu/eng/br335/1-1.html. Sep. 24-25, 2001.

Press release, "Applied Materials Launches New Atomic Layer Deposition (ALD) Technology for Nanometer-Generation Chips." http://www.appliedmaterials.com/products/ALD.html. Sep. 2001.

Faguy, Peter W., "Combustion Chemical Vapor Deposition: A New Technology for Fabricating Fuel Cell and Battery Electrodes and Electrolyte Layers." *MicroCoating Technologies*, 2001.

Ritala, Mikko & Markku Leskela, "Atomic Layer Deposition." *Handbook of Thin Film Materials, vol. 1: Deposition and Processing of Thin Films*, H.S. Nalwa (ed), Academic Press, 2002, pp. 103-159.

Ylilammi, Marrku, "Monolayer Thickness in Atomic Layer Deposition." *Thin Solid Films* 279 (1996) 124-130.

Elam, J.W. et al., "Kinetics of the WF$_6$ and Si$_2$H$_6$ Surface Reactions During Tungsten Atomic Layer Deposition." *Surface Science* 479 (2001) 121-135.

Klaus, J.W. et al., "Atomically Controlled Growth of Tungsten and Tungsten Nitride Using Sequential Surface Reactions." *Applied Surface Science* 162-163 (2000) 497-491.

Kang, Sang Yeol et al., "Deposition and Characterization of Ru Thin Films Prepared by Metallorganic Chemical Vapor Deposition." *Journal of the Korean Physical Society*, vol. 37, No. 6, Dec. 2000, pp. 1040-1044.

Kang, Sang Yeol et al., "Metallorganic Chemical Vapor Deposition of Ru Films Using Cyclopentadienyl-Propylcyclopentadienylruthenium(II) and Oxygen." *Journal of the Electrochemical Society*, 149 (6) C317-C323 (2002).

Hiratani, Masahiko et al., "Conformal Platinum Thin Films Prepared by Chemical Vapor Deposition under High Oxygen Partial Pressure." *Electrochemical and Solid-State Letters*, 5 (2) C28-C30 (2002).

Park, Sung-Eon et al., "Metallorganic Chemical Vapor Deposition of Ru and RuO$_2$ Using Ruthenocene Precursor and Oxygen Gas." *Journal of the Electrochemical Society*, 147 (1) 203-209 (2000).

Hiratani, Masahiko et al., "Platinum Film Growth by Chemical Vapor Deposition Based on Autocatalytic Oxidative Decomposition." *Journal of the Electrochemical Society*, 148 (8) C524-C527 (2001).

Kwak et al., "Study of expitaxial platinum thin films grown by metalorganic chemical vapor deposition." *J. Appl. Phys.* 72 (8) 3735-3740, Oct. 15, 1992.

Andrew M. Hecht, *Planer Silicon PEM Fuel Cell*, undated.

Helen L Maynard Jeremy P. Meyers, *Miniaturized Fuel Cells for Portable Power*, presented Apr. 27, 2000, New Orleans, LA.

Helen L. Maynard, Jeremy P. Meyers, *Miniaturized Fuel Cells for Portable Power*, paper presented Apr. 27, 2000, New Orleans, LA.

William H. Smyrl, *Development of a Silcon-Based Miniatureized Fuel Cell*, presented Apr. 26, 2000, New Orleans, LA.

S.C. Kelley, G.A. Deluga, and W.H. Smyrl, *A Miniature Methanol/Air Polymer Electrolyte Fuel Cell*, Electrochem. and Solid State Letters, Sep. 2000, vol. No. 9, Pennington, NJ.

Jeffrey D. Morse, *MicroTechnology-Based Thin-Film Fuel Cells for Portable Power Requirements*, presented Apr. 27, 2000, New Orleans, LA.

K. Kordesch, V. Hacker, V. Bachhiesl, *Direct Methanol-Air Fuel Cells with Membranes Plus Circulating Electrolytes*, Journal of Power Sources 96 (2001) 200-208, Dec. 19, 2000.

K. Kordesch, G. Koscher M. Cifrain, V. Hacker, P. Enzinoer, *Direct Methanol Fuel Cells with Circulating Electrolytes a Addition to Membranes*, 40th Power Sources Conf., Cherry Hill, NJ, Jun. 10-13, 2002.

G. D'Arrigo, C. Spinella, G. Arena S. Lorenti, *Fabrication of Miniaturized Si-based Electrocatalytic Membranes*, Materials Science and Engineering, C 987 (2002) 1-6.

\* cited by examiner

POROUS FUEL CELL ELECTRODE STRUCTURES HAVING CONFORMAL ELECTRICALLY CONDUCTIVE LAYERS THEREON

CROSS-REFERENCE TO RELATED APPLICATION

This application claims the benefit of U.S. Provisional Application No. 60/345,011 filed Jan. 3, 2002 and U.S. Provisional Application No. 60/372,903 filed Apr. 15, 2002, both of which are incorporated herein by reference in their entireties.

TECHNICAL FIELD

The present invention relates generally to fuel cells and, more specifically, to porous fuel cell electrode structures, assemblies, and systems having one or more conformal metallic layers selectively deposited on one or more pore surfaces, as well as to various methods relating thereto.

BACKGROUND OF THE INVENTION

A fuel cell is an energy conversion device that consists essentially of two opposing electrodes, an anode and a cathode, ionically connected together via an interposing electrolyte. Unlike a battery, fuel cell reactants are supplied externally rather than internally. Fuel cells operate by converting fuels, such as hydrogen or a hydrocarbon (e.g., methanol), to electrical power through an electrochemical process rather than combustion. It does so by harnessing the electrons released from controlled oxidation-reduction reactions occurring on the surface of a catalyst. A fuel cell can produce electricity continuously so long as fuel is supplied from an outside source.

In electrochemical fuel cells employing methanol as the fuel supplied to the anode (also commonly referred to as a "Direct Methanol Fuel Cell (DMFC)" system), the electrochemical reactions are essentially as follows: first, a methanol molecule's carbon-hydrogen, and oxygen-hydrogen bonds are broken to generate electrons and protons; simultaneously, a water molecule's oxygen-hydrogen bond is also broken to generate an additional electron and proton. The carbon from the methanol and the oxygen from the water combine to form carbon dioxide. Oxygen from air or oxidant (supplied to the cathode) is likewise simultaneously reduced at the cathode. The ions (protons) formed at the anode migrate through the interposing electrolyte and combine with the oxygen at the cathode to form water. From a molecular perspective, the electrochemical reactions occurring within a direct methanol fuel cell (DMFC) system are as follows:

The various electrochemical reactions associated with other state-of-the-art fuel cell systems (e.g., hydrogen or carbonaceous fuel) are likewise well known to those skilled in the art of fuel cell technologies.

With respect to state-of-the-art fuel cell systems generally, several different configurations and structures have been contemplated—most of which are still undergoing further research and development. In this regard, existing fuel cell systems are typically classified based on one or more criteria, such as, for example: (1) the type of fuel and/or oxidant used by the system, (2) the type of electrolyte used in the electrode stack assembly, (3) the steady-state operating temperature of the electrode stack assembly, (4) whether the fuel is processed outside (external reforming) or inside (internal reforming) the electrode stack assembly, and (5) whether the reactants are fed to the cells by internal manifolds (direct feed) or external manifolds (indirect feed). In general, however, it is perhaps most customary to classify existing fuel cell systems by the type of electrolyte (i.e., ion conducting media) employed within the electrode stack assembly. Accordingly, most state-of-the-art fuel cell systems have been classified into one of the following known groups:

1. Alkaline fuel cells (e.g., KOH electrolyte);
2. Acid fuel cells (e.g., phosphoric acid electrolyte);
3. Molten carbonate fuel cells (e.g., $Li_2CO_3/K_2CO_3$ electrolyte);
4. Solid oxide fuel cells (e.g., yttria-stabilized zirconia electrolyte);
5. Proton exchange membrane fuel cells (e.g., NAFION electrolyte).

Although these state-of-the-art fuel cell systems are known to have many diverse structural and operational characteristics, such systems nevertheless share many common characteristics with respect to their electrode structures. For example, one type of common electrode structures consists essentially of a conductive substrate (e.g., metal plate or porous carbon-fiber sheet) that has a substantially planar catalytic film/layer thereon (e.g., affixed or embedded catalysts particles). Another type of electrode structure consists essentially of a porous bulk matrix substrate (e.g., silicon and/or sol-gel) that has catalyst particles chemisorbed on the pore surfaces (see, e.g., International Publication No. WO 01/37357, which publication is incorporated herein by reference in its entirety). Some of the problems associated with existing porous electrode structures include, for example: (1) poor catalyst utilization, (2) less than optimal electrical conductivity, and (3) mass transfer limitations associated with reactants reaching catalytic electrode surfaces. Thus, there is still a need in the art for improved fuel cell electrode structures, assemblies, and systems. The present invention fulfills these needs and provides for further related advantages.

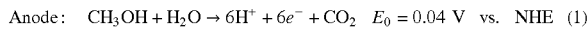
Anode: $CH_3OH + H_2O \rightarrow 6H^+ + 6e^- + CO_2$    $E_0 = 0.04$ V vs. NHE    (1)

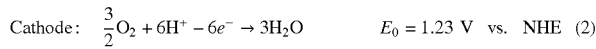
Cathode: $\frac{3}{2}O_2 + 6H^+ - 6e^- \rightarrow 3H_2O$    $E_0 = 1.23$ V vs. NHE    (2)

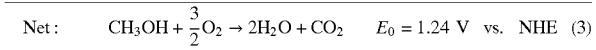
Net: $CH_3OH + \frac{3}{2}O_2 \rightarrow 2H_2O + CO_2$    $E_0 = 1.24$ V vs. NHE    (3)

SUMMARY OF THE INVENTION

In brief, the present invention relates generally to fuel cells and, more specifically, to porous fuel cell electrode structures, assemblies, and systems having a conformal metallic layer or film on one or more pore surfaces, as well as to methods relating thereto. In one embodiment, the present invention is directed to an electrode structure adapted for use with a fuel cell system (e.g., a hydrogen or a direct hydrocarbon fuel cell system), wherein the electrode structure comprises a substrate or support structure having one or more discrete porous bulk matrix regions disposed across a top surface of the substrate. In this embodiment, each of the one or more discrete porous bulk matrix regions is defined by a plurality of pores (e.g., acicular or columnar pores) that extend through the substrate or support structure. The plurality of pores define inner pore surfaces, and the inner pore surfaces have a conformal electrically conductive layer thereon. In further embodiments, the conformal electrically conductive layer is deposited by an atomic layer deposition (ALD) or an atomic layer epitaxy (ALE) chemical processing technique. As is appreciated by those skilled in the art, atomic layer deposition (ALD) is also sometimes referred to as atomic layer epitaxy (ALE); in either case, these techniques allow for the deposition of precisely controlled films and layers onto profiled substrates (Aarik et al., "Characterization of Titanium Dioxide Atomic Layer Growth from Titanium Ethoxide and Water," *Thin Solid Films*, 370:163–172 (2000)). For purposes of this application, ALD is defined as a chemical gas phase thin film deposition method based on alternate saturative surface reactions.

In some embodiments, the electrode structure of the present invention is derived from a noncarbonaceous solid substrate such as, for example, a monocrystalline silicon wafer or other crystalline material. The plurality of acicular or columnar pores may be mesoporous acicular pores, macroporous acicular pores, or a combination thereof. In further embodiments, each acicular or columnar pore has a diameter that ranges from about 0.5 to 10 microns. The substrate (from which the inventive electrode structures are derived) may have opposing (and substantially parallel) top and bottom surfaces that are spaced equidistant apart from each other. Accordingly, the thickness of substrate may range from about 75 to 2,000 microns, preferably from about 150 to 1,000 microns, and even more preferably from about 300 to 500 microns. In addition, the conformal electrically conductive layer of these further embodiments may consist essentially of one or more atomic deposition layers, wherein the one or more atomic deposition layers are formed by an atomic layer deposition (ALD) or an atomic layer epitaxy (ALE) technique. Accordingly, the conformal electrically conductive layer (or layers) may include the elements Ag, Au, Ir, Ni, Pt, Pd, Os, Ru, Rh, Re, W (as well as their oxides and nitrides), and various combinations thereof; preferably, however, the conformal electrically conductive layer includes a metal that consists essentially of a Platinum Group Metal such as Pt, Pd, Rh, Ru, Os, and Ir (as well as various combinations thereof). Moreover, the sheet resistivity of the conformal electrically conductive layer may range, depending upon its elemental components, from about 2.0 $\mu\Omega$-cm to about 1,000 $\mu\Omega$-cm. The thickness of the conformal electrically conductive layer preferably ranges from a single atomic layer up to about 2,500 Å, and preferably from about 500 Å to about 1,500 Å.

In still further embodiments, the conformal electrically conductive layer may have deposited thereon a plurality of catalysts particles such as, for example, bi-metallic particles of platinum and ruthenium (i.e., bimetallic catalysts particles derived from platinum and ruthenium precursors). The catalysts particles in these further embodiments may be either islands of nanocrystallites, an interconnected network of nanocrystallites, or a thin film.

In another aspect, the present invention is directed to methods for making an electrode structure adapted for use with a fuel cell system. Accordingly, and in one embodiment, the inventive method comprises the steps of: introducing into a reaction chamber of an atomic deposition device a substrate having one or more discrete porous bulk matrix regions disposed across a top surface of the substrate, wherein each of the one or more discrete porous bulk matrix regions is defined by a plurality of pores that extend into or through the substrate, wherein the plurality of pores define inner pore surfaces; and sequentially introducing into the reaction chamber at least one precursor followed by a purge gas so as to deposit one or more atomic layers on at least the inner pore surfaces thereby defining an electrode structure having a conformal electrically conductive layer thereon. In some embodiments, the at least one precursor (e.g., reactant gas) and gas flow through the plurality of pores of the substrate.

These and other aspects of the present invention will become more evident upon reference to the following detailed description and attached drawings. It is to be understood, however, that various changes, alterations, and substitutions may be made to the specific fuel cell electrode structures disclosed herein without departing from the essential spirit and scope of the present invention. In addition, it is to be further understood that the drawings are illustrative and symbolic representations of exemplary embodiments of the present invention (hence, they are not necessarily to scale). Finally, it is expressly provided that all of the various references cited herein are incorporated by reference in their entireties.

DETAILED DESCRIPTION OF THE INVENTION

Figure 1:
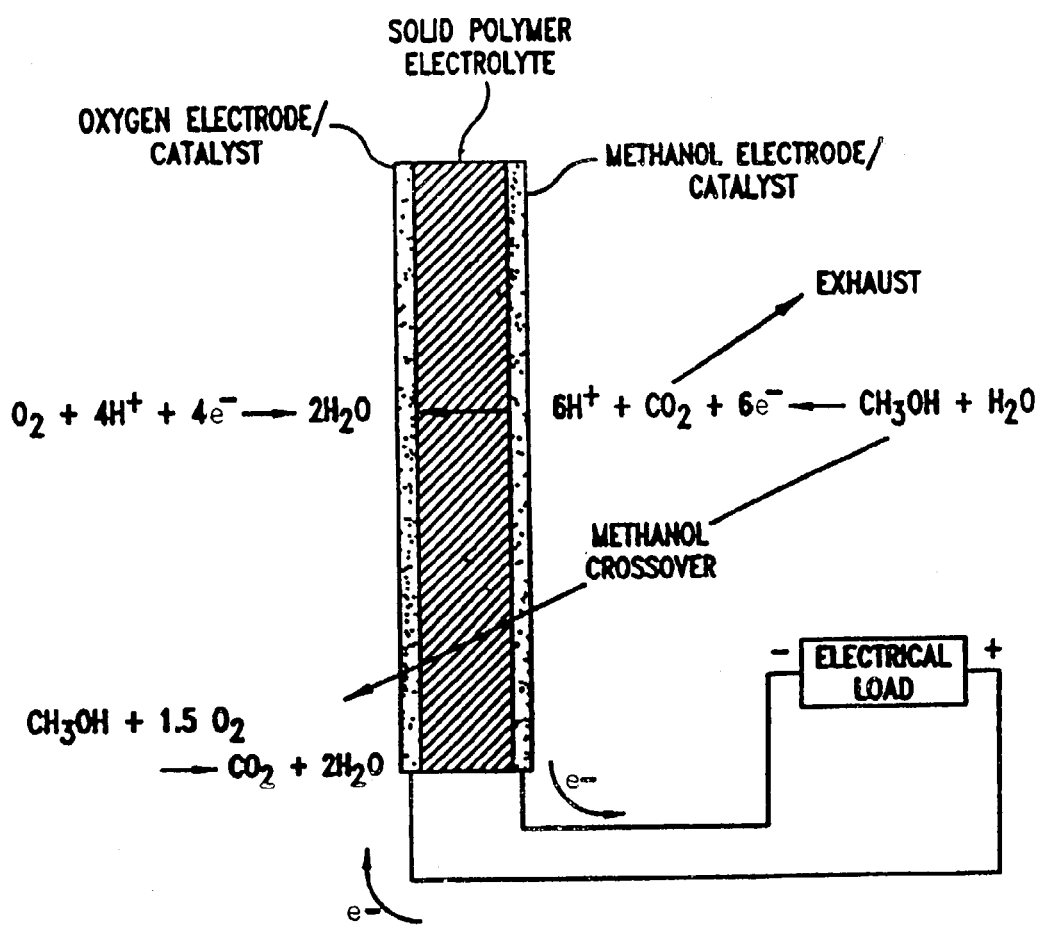
FIG. 1 illustrates a fuel cell system in accordance with the prior art.

The present invention relates generally to fuel cells and, more specifically, to porous fuel cell electrode structures, assemblies, and systems having a conformal metallic layer selectively deposited on one or more pore surfaces, as well as to various methods relating thereto. As is appreciated by those skilled in the fuel cell technology art, a fuel cell system generally comprises a stack of electrode assemblies (referred to as an electrode stack assembly), wherein each individual electrode assembly consists essentially of two opposing electrode structures, an anode and a cathode, ionically connected together via an interposing electrolyte. The electrode stack assembly of such fuel cell systems also generally includes a series of flow channels for flowing reactant streams adjacent to and/or through discrete regions of the electrode structures. A fuel cell system in accordance with the prior art is shown in FIG. 1 (details have been omitted).

Figure 2A:
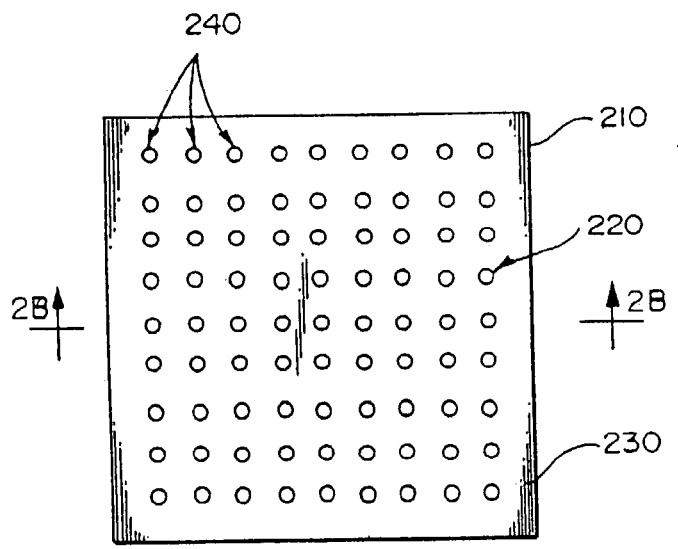
FIG. 2A illustrates a top plan view of an electrode structure having a plurality of acicular pores in accordance with an embodiment of the present invention.
Figure 2B:
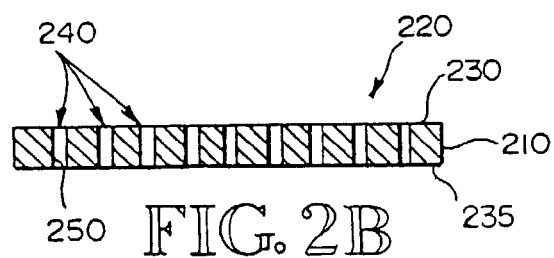
FIG. 2B illustrates a cross-sectional view of the electrode structure of FIG. 2A, wherein the view is taken along line B—B of FIG. 2A.
Figure 2C:
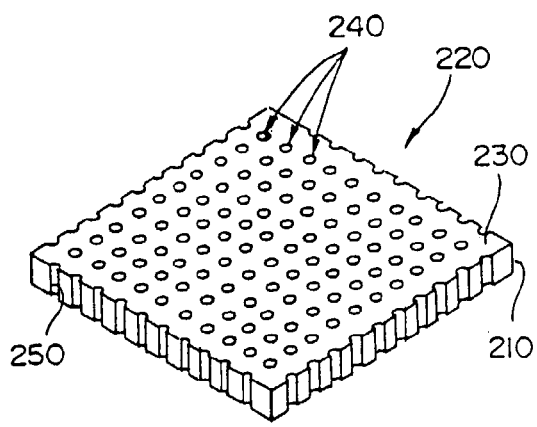
FIG. 2C illustrates a top perspective view of the electrode structure of FIGS. 2A and 2B.
Figure 3:
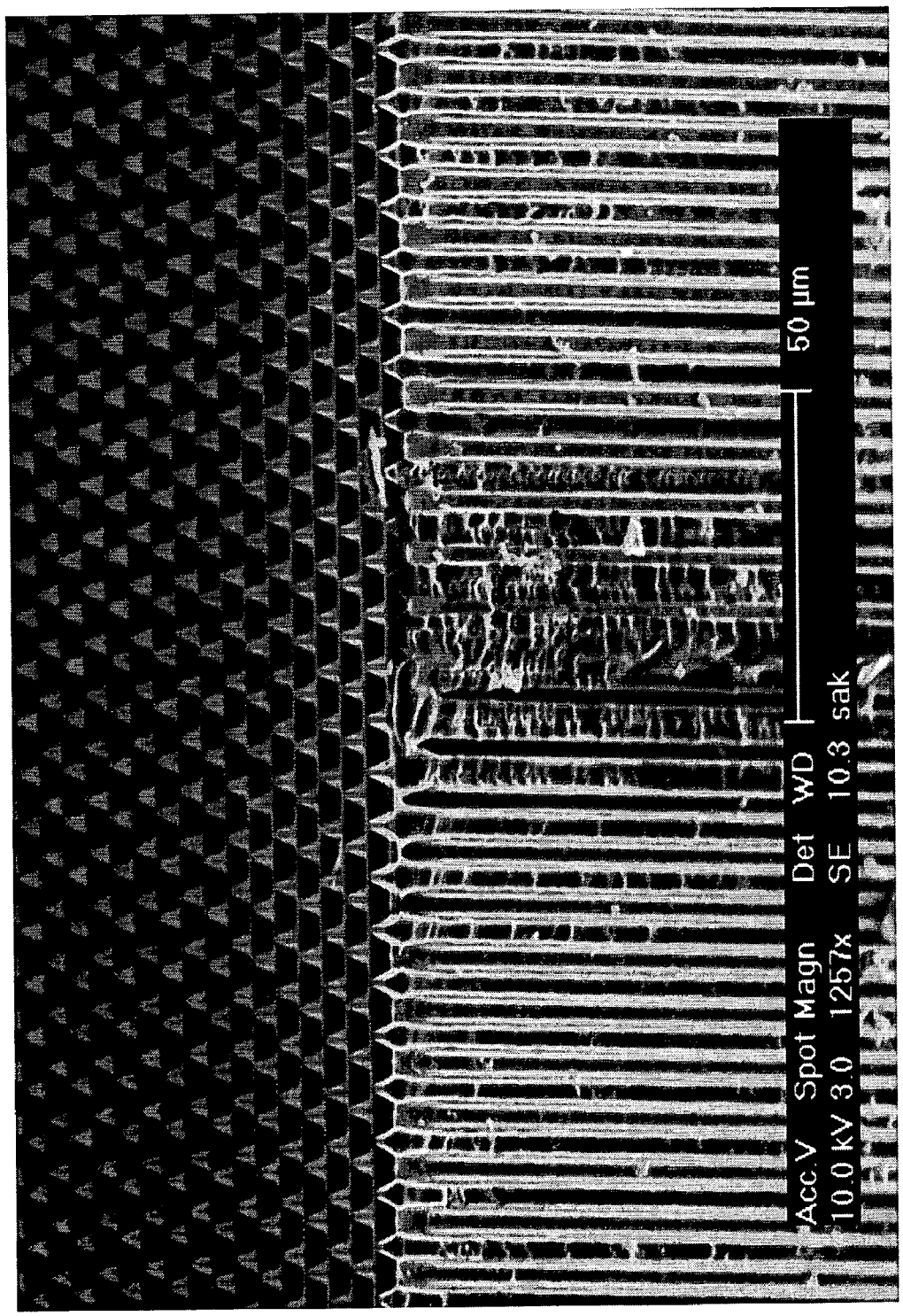
FIG. 3 is a magnified (1257×) perspective cross-sectional view of a portion of an etched silicon support structure showing an ordered array of acicular pores in accordance with an embodiment of the present invention.
Figure 4:
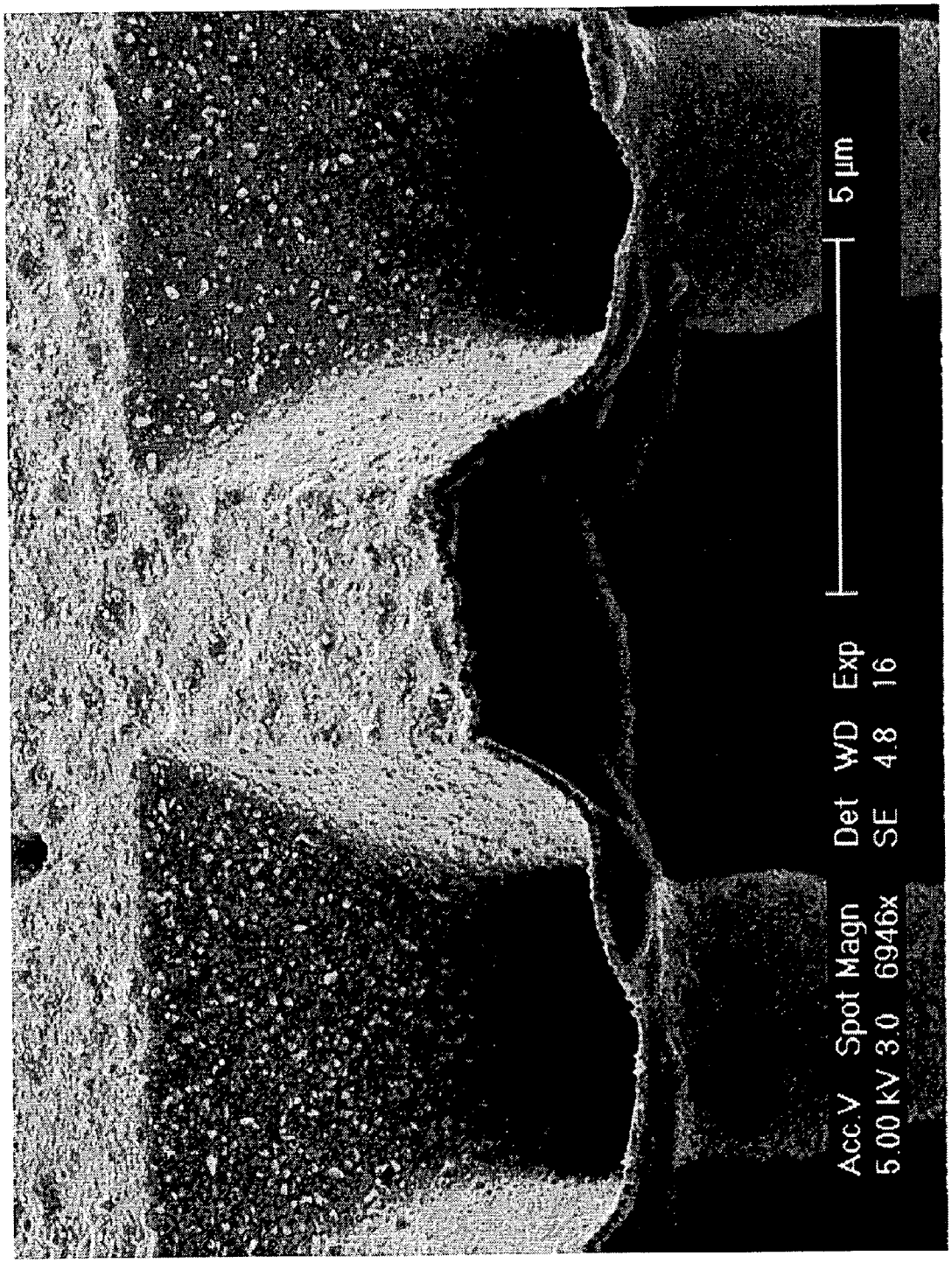
FIG. 4 is a magnified (6946×) perspective cross-sectional view of a portion of an etched silicon support structure showing an ordered pair of acicular pores having a conformal film of Ru deposited thereon.
Figure 5:
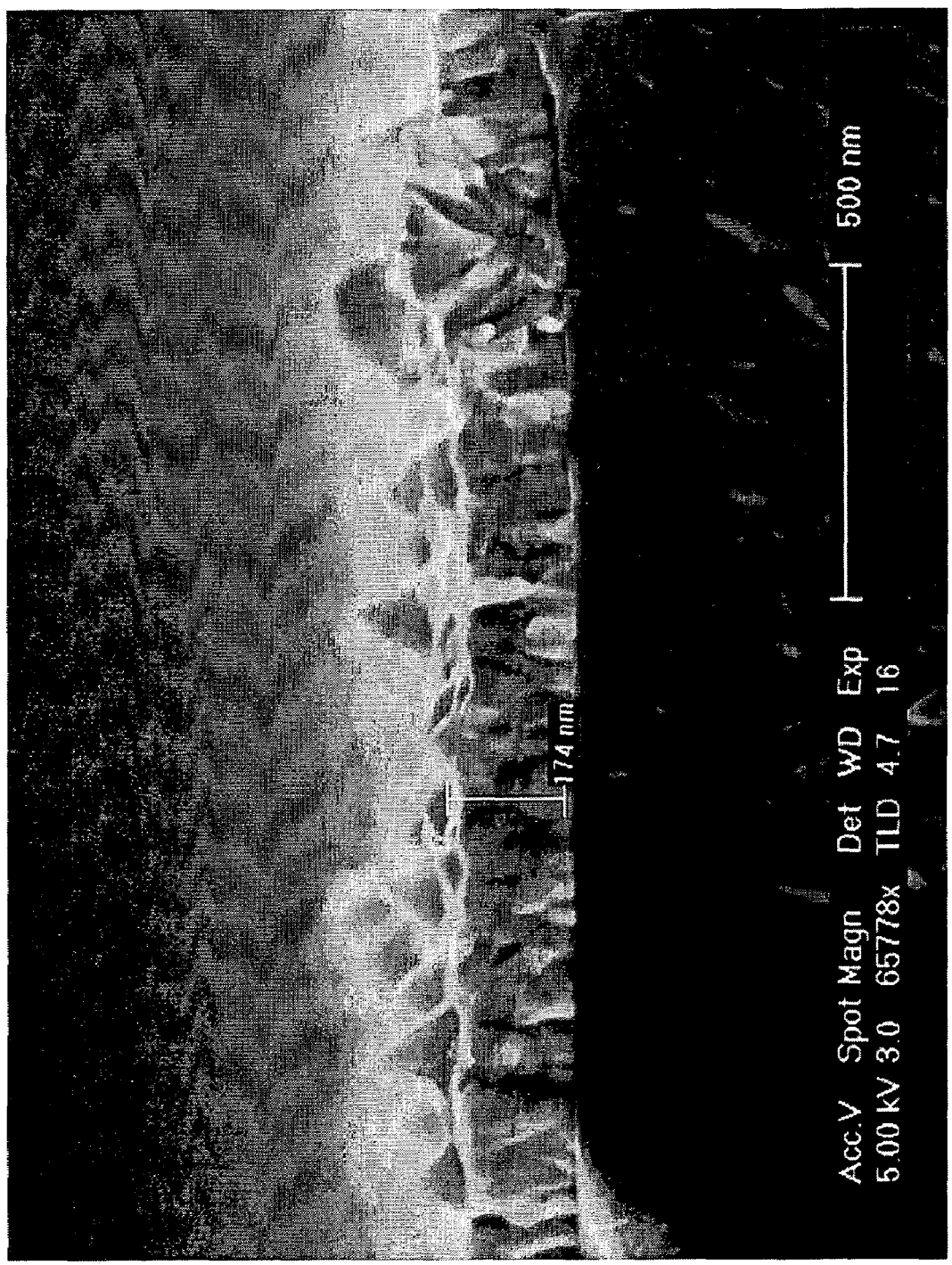
FIG. 5 is a magnified (65778×) side cross-sectional view of a portion of an etched silicon support structure showing an internal pore surface having a conformal film (about 174 nm thick) of Ru deposited thereon.
Figure 6:
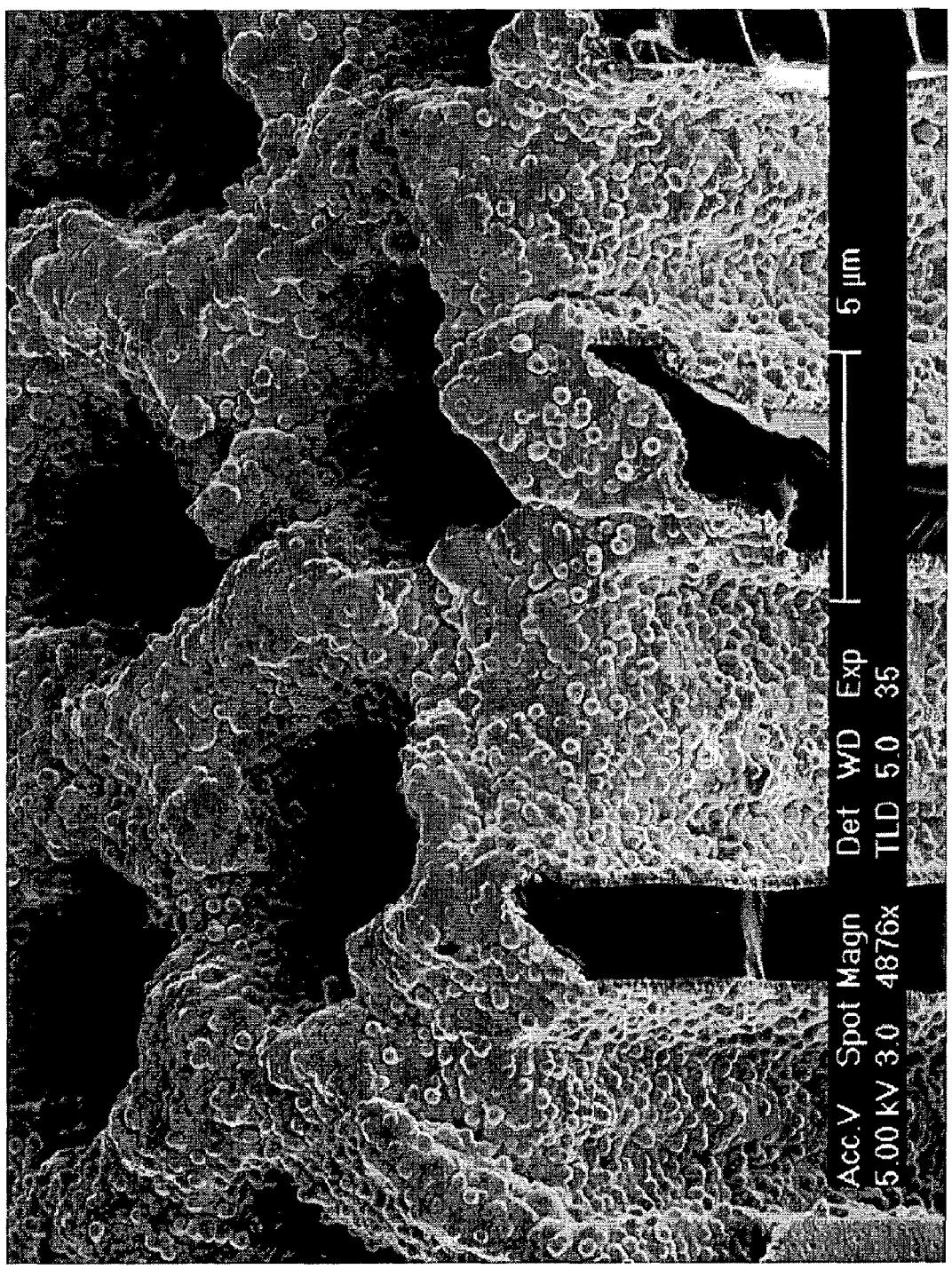
FIG. 6 is a magnified (4876×) perspective cross-sectional view of a portion of an etched silicon support structure showing an ordered pair of acicular pores having a conformal film of Ru deposited thereon, wherein the conformal film of Ru has a plurality of electro-deposited Pt—Ru catalyst particles thereon.
Figure 7:
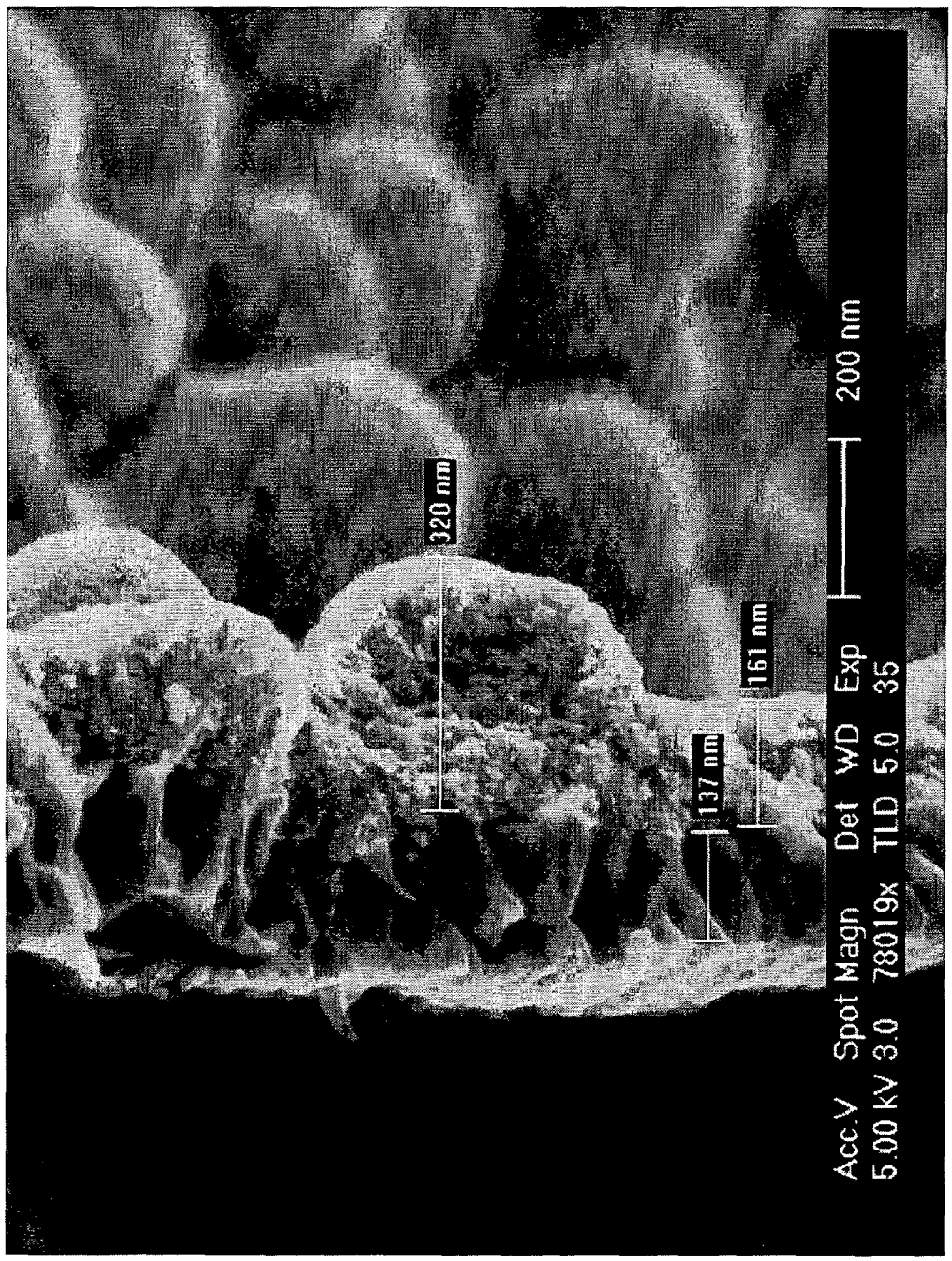
FIG. 7 is a magnified (78019×) side cross-sectional view of a portion of an etched silicon support structure showing an internal pore surface having a conformal film (about 137 nm thick) of Ru deposited thereon, wherein the conformal film of Ru has a plurality of electro-deposited Pt—Ru catalyst particles thereon.
Figure 8:
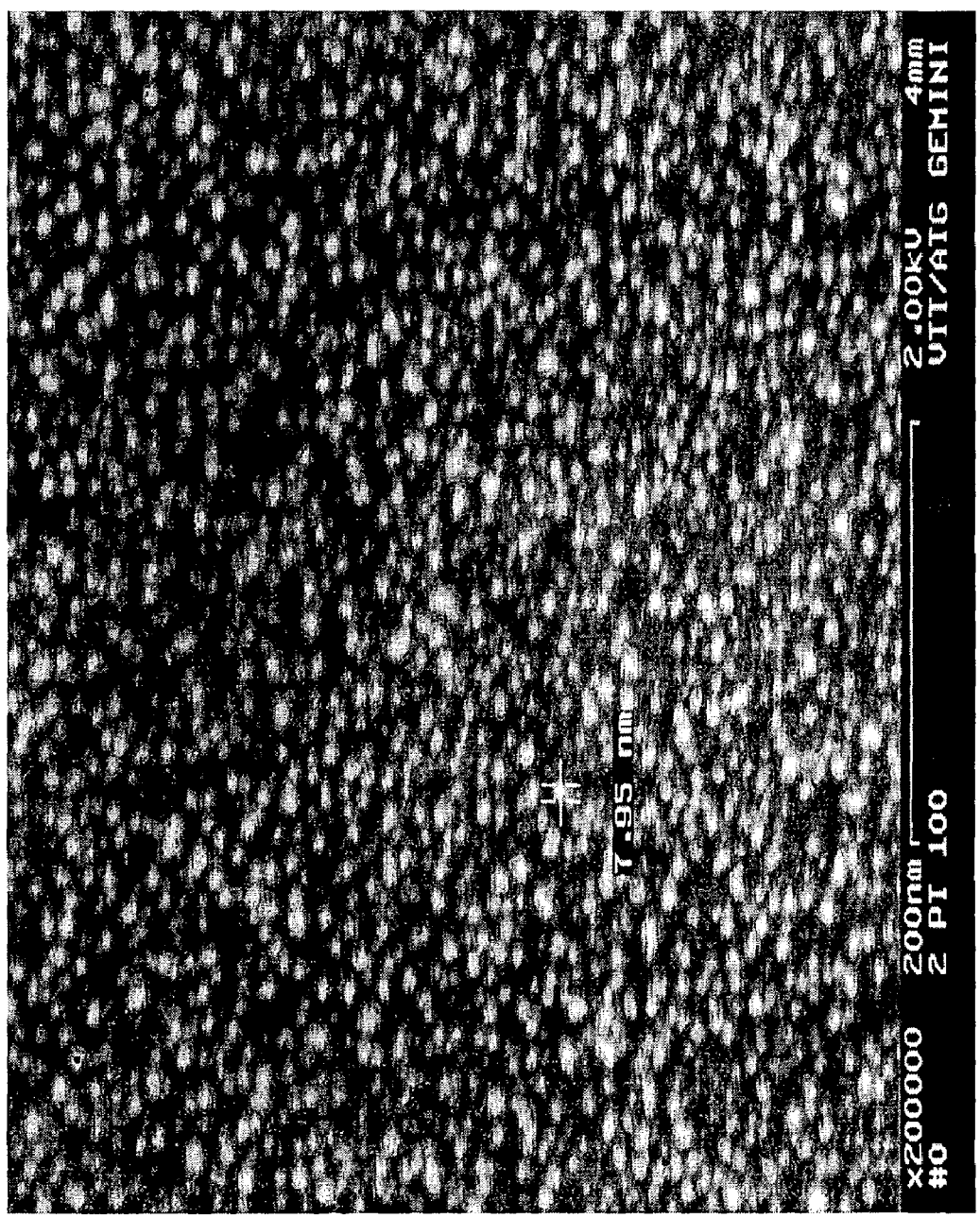
FIG. 8 is a magnified (200000×) side cross-sectional view of a portion of an etched silicon support structure showing a plurality of deposited Pt catalyst particles formed by ALD with 100 process cycles of Trimethyl methylcyclopentadienyl platinum.
Figure 9:
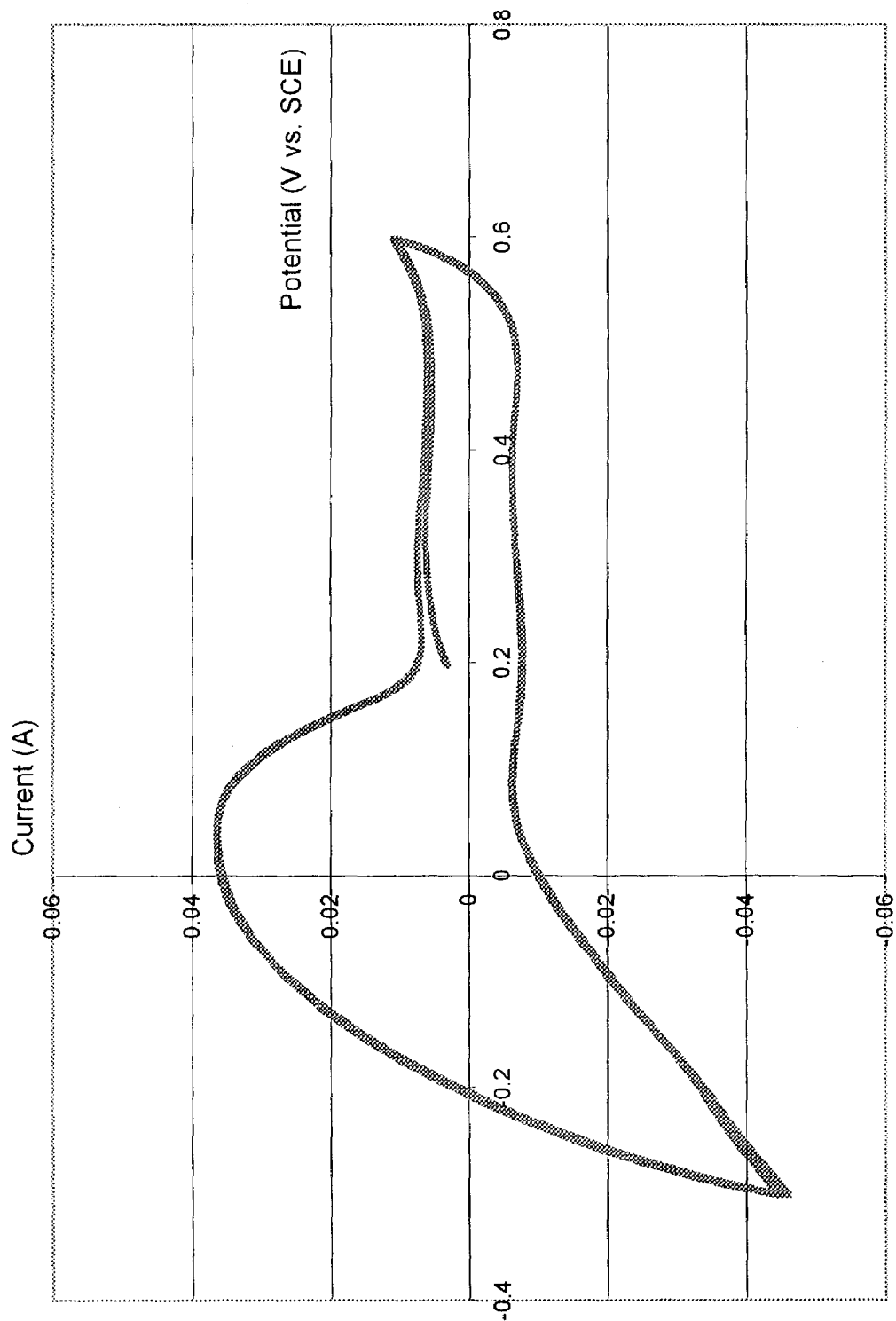
FIG. 9 shows a cyclic voltammogram of an exemplary porous electrode structure (1 cm×1 cm porous area, 4.5 μm in diameter and 450 μm in depth) having a Ru layer made in accordance with Example 1 and a bimetallic catalyst system made in accordance with Example 5. The cyclic voltammogram was obtained at room temperature in 2 M sulfuric acid at 10 mV/sec sweep rate using SCE reference electrode.

An exemplary embodiment of the present invention is shown in FIGS. 2A–C, which drawings show an isolated electrode structure 200 (which structure is adapted for use with a fuel cell system). The electrode structure 200 in this embodiment comprises a substrate 210 (support structure) having one or more discrete porous bulk matrix regions 220 disposed across a top surface 230 of the substrate 210. In addition, each of the one or more discrete porous bulk matrix regions 220 is defined by a plurality of acicular or columnar pores 240 that extend through the substrate 210. The plurality of acicular or columnar pores define inner pore surfaces 250, and the inner pore surfaces 250 have a conformal electrically conductive layer (not shown) thereon. In some embodiments and as shown, the pores are substantially perpendicular to the top and bottom surfaces 230, 235 of the substrate 210.

The substrate or support structure from which the electrode structures of the present invention may generally be derived from include noncarbonaceous solid materials such as, for example, monocrystalline silicon or a metal having an ordered crystal lattice structure (i.e., crystalline) and polycrystallione materials such as, for example, Raney nickel or a reticulated or perforated metal plate. Alternatively, the substrate or support structure may be derived from a carbonaceous material such as, for example, graphite, a carbon-fiber paper, carbon foam, or a conductive polymer. In further embodiments, the substrate or support structure is a ceramic material such as, for example, a porous carbide, a porous nitride, or a porous oxide. In still further embodiments, the substrate or support structure is a foamed metal such as, for example, a Nickel foam, a Ruthenium foam, or a Rhodium foam. Preferably, however, the substrate of the present invention consists essentially of silicon (e.g., a support structure derived from a silicon wafer).

Accordingly, and in one preferred embodiment, the substrate or support structure of the present invention is porous silicon (derived from a silicon wafer). In this regard, porous silicon substrates (and/or support structures) may be formed by silicon micro-machining and/or wet chemical techniques (employed by the semiconductor industry) such as, for example, anodic polarization of silicon in hydrofluoric acid. As is appreciated by those skilled in the art, the anodic polarization of silicon in hydrofluoric acid (HF) is a chemical dissolution technique and is generally referred to as HF anodic etching; this technique has been used in the semiconductor industry for wafer thinning, polishing, and the manufacture of thick porous silicon films. (See, e.g., Eijkel, et al., "A New Technology for Micromachining of Silicon: Dopant Selective HF Anodic Etching for the Realization of Low-Doped Monocrystalline Silicon Structures," *IEEE Electron Device Ltrs.*, 11(12):588–589 (1990); International Publication No. WO 01/37357 to Neah Power Systems, Inc.). In the context of the present invention, it is to be understood that the porous silicon may be nanoporous silicon (i.e., average pore size <2 nm), mesoporous silicon (i.e., average pore size of 2 nm to 50 nm), or microporous silicon (i.e., average pore size >50 nm); the pores may also be a series of parallelly aligned acicular or columnar pores that extend into or through the silicon substrate. Although the acicular pores may be angled, they are preferably substantially perpendicular to the surfaces of the substrate and generally have aspect ratios (height:width) of greater than about 50:1. The aspect ratios of the acicular pores, however, may range from about 30:1 to about 1,000:1, and preferably from about 100:1 to about 500:1.

More specifically, porous silicon substrates useful in the context of the present invention may be formed by a photoelectrochemical HF anodic etching technique, wherein selected oxidation-dissolution of silicon occurs under a controlled current density. (See, e.g., Levy-Clement et al., "Porous n-silicon Produced by Photoelectrochemical Etching," *Applied Surface Science*, 65/66: 408–414 (1993); M. J. Eddowes, "Photoelectrochemical Etching of Three-Dimensional Structures in Silicon," *J. of Electrochem. Soc.*, 137 (11):3514–3516 (1990).) An advantage of this relatively more sophisticated technique over others is that it is largely independent of the different principal crystallographic planes associated with single-crystal silicon wafers (whereas most anisotropic wet chemical etching methods have very significant differences in rates of etching along the different principal crystallographic planes).

In another preferred embodiment, the conformal electrically conductive layer of the present invention may be selectively deposited on the one or more pore surfaces of the selected substrate or support structure by use of a sequential gas phase deposition technique such as, for example, atomic layer deposition (ALD) or atomic layer epitaxy (ALE). As with more traditional chemical vapor deposition (CVD) techniques, the reactants or precursors used with a sequential atomic deposition technique are introduced into a deposition or reaction chamber as gases. Unlike CVD, however, the reactants or precursors used are supplied in pulses, separated from each other (in the flow stream) by an intervening purge gas. Each reactant pulse chemically reacts with the substrate; and it is the chemical reactions between the reactants and the surface that makes sequential atomic deposition a self-limiting process that is inherently capable of achieving precise monolayer growth (see, e.g., *Atomic Layer Deposition*, T. Suntola and M. Simpson, Eds., Blackie and Sons (1990)).

In this regard, solid thin films may be grown on heated substrates by exposing the heated substrate to a first evaporated gaseous element or compound, allowing a monolayer of the element to form on the surface of the substrate, and then removing the excess gas by evacuating the chamber with a vacuum pump (or by use of a purge gas such as Argon or Nitrogen). Next, a second evaporated gaseous element or compound may be introduced into the reaction chamber. The first and second elements/compounds can then combine to produce a solid thin compound monolayer film. Once the monolayer film has been formed, any excess second evaporated gaseous element or compound may be removed by again evacuating the chamber with the vacuum pump. The desired film thickness may be built up by repeating the process cycle many (e.g., hundreds or thousands) of times. Accordingly, such atomic deposition techniques may be used to deposit on an electrode support structure (e.g., silicon or other appropriately selected substrate) a variety of materials, including group II–VI and III–V compound semiconductors, elemental silicon, $SiO_2$, and various metal oxides and nitrides thereof. In one preferred embodiment, however, an atomic layer deposition (ALD) technique is used to selectively deposit on the pore surfaces of a porous silicon support structure a conformal electrically conductive layer that consists essentially of a Platinum Group Metal such as Pt, Pd, Rh, Ru, Os, and Ir (as well as various combinations thereof). The thickness of the conformal electrically conductive layer preferably ranges from a single atomic layer up to about 2,500 Å, and preferably from about 500 Å to about 1,500 Å. The conformal electrically conductive layer enhances electrical conductivity (between the electrons released on the catalyst as a result of electrochemical oxidation-reduction reactions), and may also function as a catalyst.

Moreover, and as noted above, atomic deposition techniques may also be used to deposit a film or layer containing a metal and a non-metal such as, for example, O or N. In such a scenario, the first reactant pulse may contain the metal and the second reactant pulse the non-metal. The first pulse deposits a metal-containing layer, and the reactant of the second pulse reacts with that layer to form the complete film of metal oxide or metal nitride. Both reactants react chemically with the surface on which they deposit, and each reaction is self-limiting. In this way, film or layer thicknesses may be controlled to within a monolayer solely by limiting the number of pulses. In addition to being extremely uniform and conformal, the deposited films may be amorphous, epitaxial or polycrystalline. In the context of the present invention, the deposition rate of the atomic deposition process is preferably about one atomic layer per cycle and the reaction temperature preferably ranges from about 200–400° C.

A suitable device for depositing a thin film material one layer at a time by the application of two or more separate precursor compounds has been described in the art (see, e.g., U.S. Pat. No. 6,342,277 to Sherman). As is appreciated by those skilled in the art, ALD processes may be performed in many kinds of reactors over a wide pressure range from atmospheric to ultrahigh vacuum (UHV). Although ALD processes are relatively new techniques, ALD reactors have generally been divided into two groups: inert gas flow reactors operating under viscous or transition flow conditions at pressures higher than about 1 Torr, and high- or ultrahigh-vacuum reactors with molecular flow conditions. The former resemble CVD reactors while the latter are like molecular beam epitaxy (MBE) reactors. A suitable ALD reactor useful in the context of the present invention is commercially available from ASM Microchemistry Ltd., Finland.

The first reactant (introduced into a suitable ALD reactor) may be a compound having the elements of the monolayer to be formed on the target part or substrate such as, for example, the precursors listed below and in the Examples set forth herein. In some embodiments, suitable metal precursors for forming Ru and $RuO_2$ conductive layers may include one or more of the following: (1) Dodecacarbonyl-triruthenium ($Ru_3(CO)_{12}$); (2) Bis (2,2,6,6-tetramethyl-3,5-heptanedionato) (1,5-cyclooctadiene) ruthenium (II) (Ru $(C_{11}H_{19}O_2)_2(C_8H_{12})$); (3) Bis (ethylcyclopentadienyl) ruthenium (II) ($Ru[(CH_3CH_2)C_5H_4]_2$); (4) Ruthenium (III) ethoxide, ($Ru(OC_2H_5)_3$); (5) Biscyclopentadienylruthenium [Ruthenocene] ($Ru(C_5H_5)_2$); (6) Ruthenium (III) acetylacetonate ($Ru(CH_3COCHCOCH_3)_3$); (7) Tris (2,2,6,6-tetramethyl-3,5-heptanedionate) ruthenium (III) ($Ru(TMHD)_3$), $Ru(C_{11}H_{19}O_2)_3$; and (8) Ruthenium (III) chloride ($RuCl_3$). In addition to the above, other compounds may also be volatilized and used as a precursor—other compounds such as, for example, pure metals, metal halides and oxychlorides, β-diketonates, and metal alkoxides and acetates, as well as metallocenes. (The various precursors listed above and herein are generally available from Strem Chemicals, Inc., Newburyport, Me.)

Regardless of the precursor selected, the type and character of deposited film is generally determined by the number and sequence of reactants used. For example, if a ternary film is desired, the ALD process system would include three separate precursors. In other embodiments, one of the separate reactants may contain $H_2$, $O_2$, $H_2O$, or $H_2O_2$. In still other embodiments, a metal oxide layer or thin film may first be deposited followed by reduction with $H_2$ to yield the metal. In either case, a conventional digital microcontroller is generally used to sequence the delivery of the reactants to the ALD reaction chamber at the appropriate times.

In still further embodiments of the present invention, the conformal electrically conductive layer may have deposited thereon a plurality of catalyst particles such as, for example, bi-metallic particles of platinum and ruthenium (i.e., chemisorbed bi-metallic catalyst particles derived from platinum and ruthenium precursors). For example, a plurality of catalyst particles may be deposited on the conformal electrically conductive layer by an appropriate deposition method such as, for example, an electroless deposition method, an electro-deposition method, and an ALD method. With regards to the electroless deposition methods, catalyst particles may be formed by chemical reduction of metal salts and/or complexes such as, for example, Dihydrogen hexachloroplatinate (IV) ($H_2PtCl_6$) and Ruthenium (III) chloride ($RuCl_3$). With regards to the electro-deposition methods, catalyst particles may be formed by use of appropriately selected plating solutions. In this regard, a plating solution for making an anode structure may be comprised of: (a) 0.015 to 0.05 M solution of Pt (added as $H_2PtCl_6$-$nH_2O$) in 1–2 M $H_2SO_4$ solution; and (b) 0.015 to 0.05 M solution of Ru (added as $RuCl_3$-$nH_2O$) in 1–2 M $H_2SO_4$ solution; and wherein ethanol is added to (a) and (b) to result in a 25–50 vol. % mixture (preferably about 25%). A plating solution for making a cathode structure may be comprised of: (a) 0.015 to 0.05 M solution of Pt (added as $H_2PtCl_6\text{-}nH_2O$) in 1–2 M $H_2SO_4$ solution; and (b) 0.015 to 0.4 M solution of Ru (added as $RuCl_3\text{-}nH_2O$) in 1–2 M $H_2SO_4$ solution; and wherein ethanol is added to (a) and (b) to result in a 25–50 vol % mixture (preferably 25%). The above plating solutions may have other components added to enhance plating on the high aspect ratio porous silicon support structures disclosed herein, such as complexing agents (e.g. EDTA), brighteners, or inhibitors, many of which are purchased from plating vendors with proprietary formulations.

The appropriately selected plating solution may generally be delivered (via standard microfluidic tubing and connections) through a properly positioned porous support structure at a flow rate of 0.05 to 0.25 mL/min (preferably 0.08 mL/min), while holding the sample potentiostatically at –0.05 to –0.25 V vs. Ag/AgCl reference electrode (preferably –0.075 to 0.125 V vs. Ag/AgCl) for a duration of about 30 to 90 minutes (preferably 80 minutes) such that the total charge delivered to the structure is about 80 to 120 C (preferably about 100 C). Alternatively, the plating solution may be delivered through the porous support structure at a flow rate of about 0.05 to 0.25 mL/min (preferably 0.08 mL/min) while holding the structure galvanostatically at –0.05 to –0.25 V vs. Ag/AgCl reference electrode (preferably –0.075 to 0.125 V vs. Ag/AgCl) for a duration of about 30 to 90 minutes (preferably about 80 minutes) such that the total charge delivered to the structure is about 80 to 120 C (preferably about 100 C).

In addition to a contiguous layer, the deposited catalyst particles of the present invention may comprise either islands of nanocrystallites or an interconnected network of nanocrystallites. In this regard, island formation may be controlled to a large extent by increasing or decreasing the number of bonding sites on the surface of the underlying substrate or support structure. For example, metal concentration on the surface may be decreased by reducing the number of bonding sites by either dehydroxylation (heat treatment) or chemical blocking of the bonding sites with, for example, hexamethyldisilazane (HMDS) (E. Lakomaa, "Atomic Layer Epitaxy (ALE) on Porous Substrates," *J Applied. Surface Science*75:185–196 (1994)). In some embodiments, suitable precursors for forming Pt nanocrystallites may include one or more of the following: (1) Platinum (II) hexafluoroacetaylacetonate (Pt$(CF_3COCHCOCF_3)_2$); (2) Dimethyl(1,5-cyclooctadiene) platinum (II) (($CH_3)_2Pt(C_8H_{12})$); (3) Trimethyl(methylcyclopentadienyl) platinum ($CH_3C_5H_4Pt(CH_3)_3$); (4) Platinum (II) acetylacetonate (Pt($CH_3COCHCOCH_3)_2$); and (5) Dihydrogen hexachloroplatinate (IV) ($H_2PtCl_6$).

Nano-crystallites of Platinum and Ruthenium (as opposed to a contiguous film) may also be deposited by an ALD method. Although ALD growth theoretically should proceed in a layer-by-layer fashion, phenomena of island formation or nucleation of agglomerates during early stages of ALD growth have been reported (T. Suntola, *Surface chemistry of materials deposition at atomic layer level*, Appl. Surf. Sci. 100/101 (1996) 391–398). It is, therefore, possible to encourage island formation and thus growth of nano-sized particles by controlling surface saturation density of the metal precursor in several different ways. One way is to increase the size of the precursor molecule, in other words, choosing a Ruthenium and/or Platinum metal precursor with bulky ligands to increase the spacing between the resulting metal atoms thus reducing the metal density. One example of such a precursor is Bis(2,2,6,6-tetramethyl-3,5 heptanedionato)(1,5-cyclooctadiene)ruthenium (II), Ru($C_{11}H_{19}O_2)_2$ ($C_8H_{12}$). Another way is to limit the pulse time of the metal precursor such that surface saturation does not proceed to completion. Once the nano-crystallites are formed, the number of cycles applied in a run may also be limited so as to prevent crystallites or agglomerates from growing laterally into a contiguous film.

In addition and as appreciated by those skilled in the art, catalyst activity and stability at the anode of a direct methanol fuel cell is generally a function of the Platinum to Ruthenium ratio. Therefore, it is generally important to be able to vary this ratio at the atomic level and in a homogeneous manner. This may be achieved by ALD, more specifically, by alternating pulses of platinum and ruthenium precursors separated by their respective oxygen and purging gas pulses. The relative frequencies and respective durations of the platinum and ruthenium precursor pulses may then be optimized to result in a desired platinum-to-ruthenium ratio. For example, each ALD cycle could deposit two atomic layers of platinum followed by one atomic layer of ruthenium to yield platinum-rich catalysts.

Finally, a porous coating may be applied on a porous silicon substrate or support structure prior to atomic layer deposition of electro-catalysts thereby further increasing the catalytically active surface area of the electrode. Examples of such coatings include electro-deposited metal layers and porous oxide coatings. A micro or nanoporous silica film may be formed on the pore surfaces of the electrode structure, for example, by hydrolysis and condensation of tetraethyl orthosilicate (TEOS) followed by appropriate heat treatment.

For purposes of illustration and not limitation, the following examples more specifically disclose various aspects of the present invention.

EXAMPLES

Examples 1–5 disclose, among other things, general processing steps associated with making various electrode structures adapted for use with a fuel cell system, wherein each electrode structure comprises a silicon substrate having a plurality of acicular or columnar pores that extend through the substrate, wherein each of the plurality of pores has one or more atomic layers of an electrically conductive material deposited thereon.

Example 1

Ald Deposition of a Conformal, Well-Adhered Ruthenium Layer within the Pores of Porous Silicon An etched silicon wafer electrode support structure having a plurality of acicular pores of about 500 µm in depth and about 5 µm in pore diameter was first oxidized by exposure to water vapor at 500° C. to form a fresh silicon oxide layer (the oxide layer provided a clean and homogeneous surface for subsequent ruthenium deposition, thus promoting uniformity and improving adhesion of the ruthenium film). Bis(cyclopentadienyl)ruthenium maintained at 60° C. and oxygen gas were used as precursors for ruthenium deposition. Nitrogen was used as both the precursor carrier and the purge gas. In order to enhance access of reactants to the pores, the porous support structure was situated perpendicular to the flow of reactants in the reaction chamber. The reaction temperature was maintained at about 350° C. and the pressure was maintained at 2 mbar. Each reaction cycle consisted of alternating pulses of bis(cyclopentadienyl)ruthenium and oxygen gas separated by the purge gas. The pulse duration of both the ruthenium precursor and oxygen gas was about 6.0 seconds and the purge duration was about 9.0 seconds. The number of reaction cycles selected determined the thickness of film deposited.

Example 2

Ald Deposition of a Conformal, Well-Adhered Platinum Layer within the Pores of Porous Silicon Same as Example 1 except that Trimethyl methylcyclopentadienyl platinum and oxygen were selected as the precursors. In this example, the platinum precursor and oxygen were separately pulsed through the reaction chamber with intervening nitrogen purging steps. The reaction temperature was set to about 300° C. The pulse duration was about 6.0 second for trimethyl methylcyclopentadienyl platinum and about 6.0 second for $O_2$, whereas the separating purging pulses of argon at were about 9.0 seconds in duration.

Example 3

Ald Deposition of a Bimetallic Anode Catalyst System within the Pores of Porous Silicon Having an Underlying Ruthenium Layer to Yield Platinum Nanocrysyallites An electrode support structure having an underlying Ruthenium layer as in Example 1 was provided. Platinum nanocrystallites were subsequently deposited by limiting the number of reaction cycles to about 100 cycles, yielding islands of platinum particles between 2–20 nm in size. Each cycle consisted of alternating pulses of trimethyl methylcyclopentadienyl platinum and oxygen gas with durations of about 10 seconds, separated by pulses of the purge gas with durations of about 20 seconds.

Example 4

Ald Deposition of a Bimetallic Anode Catalyst System within the Pores of Porous Silicon Having an Underlying Ruthenium Layer An electrode support structure having an underlying Ruthenium layer as in Example 1 was provided. Bis(cyclopentadienyl)ruthenium maintained at 60° C. and oxygen gas were used as precursors for ruthenium deposition. Trimethyl methylcyclopentadienyl platinum maintained at room temperature and oxygen were used as the precursors for platinum deposition. Nitrogen was used as both the precursor carrier and the purge gas. The reactor used was a hot-wall flow-type F-120 ALD reactor (ASM Microchemistry Ltd., Finland). In order to enhance access of reactants to the pores, the porous support structure was situated perpendicular to the flow of reactants in the reaction chamber. The reaction temperature was maintained at about 350° C. and the pressure was maintained at about 2 mbar. Each reaction cycle consisted of one or more alternating pulses of bis(cyclopentadienyl)ruthenium and oxygen gas separated by the purge gas, and one or more alternating pulses of trimethyl methylcyclopentadienyl and oxygen gas separated by the purge gas. The pulse duration for trimethyl methylcyclopentadienyl platinum, bis(cyclopentadienyl)ruthenium and oxygen was about 6.0 seconds, whereas the separating purging pulses of nitrogen were about 9.0 seconds. The relative frequencies and respective durations of the platinum and ruthenium precursor pulses were then be optimized to result in a desired platinum-to-ruthenium ratio. In this regard, each ALD cycle deposited two atomic layers of platinum followed by one atomic layer of ruthenium to yield a platinum-rich catalyst system.

Example 5

Electro-Deposition of a Bimetallic Anode Catalyst System within the Pores of Porous Silicon Having an Underlying Ruthenium Layer An electrode support structure having an underlying Ruthenium layer as in Example 1 was provided. The Ruthenium coated electrode structure was then mounted into specially designed apparatus to ensure a fluidic seal and electrical contact. A flow restrictor layer (i.e., PTFE membrane, 10 μm average pore size) was placed over the porous support structure on the incoming flow side. The apparatus was then connected to a syringe pump through standard microfluidic connections. Prior to flowing the plating solution through the porous support structure at about 0.08 mL/min, the plating solution was degassed in Argon for about 20 minutes. The plating solution consisted essentially of a 0.025 M solution of Pt (added as $H_2PtCl_6$-$nH_2O$) in 1–2 M $H_2SO_4$ solution together with a 0.025 M solution of Ru (added as $RuCl_3$-$nH_2O$) in 1–2 M $H_2SO_4$ solution, and wherein ethanol was added to result in a 25 vol. % mixture. While the plating solution was passing through the support structure, the structure was potentiostatically held at −0.075 to 0.125 V vs. Ag/AgCl reference electrode for a duration of about 80 minutes such that the total charge delivered to the structure was about 100 C.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

The invention claim is:

1. A fuel cell electrode structure comprising a substrate having one or more discrete porous regions disposed across a top surface of the substrate, wherein each of the one or more discrete porous regions is defined by a plurality of pores that have aspect ratios of about 30:1 and that extend through the substrate, wherein the plurality of pores define inner pore surfaces, and wherein the inner pore surfaces have a conformal electrically conductive film layer thereon, wherein the conformal electrically conductive film layer also extends through the substrate and has an electrical resistivity of less than 1,000 μΩ-cm, and wherein the conformal electrically conductive film layer has a plurality of catalyst particles dispersed thereon.

2. The fuel cell electrode structure of claim 1 wherein the plurality of pores are mesoporous acicular pores, macroporous acicular pores, or a combination thereof.

3. The fuel cell electrode structure of claim 1 wherein each of the plurality of pores has a diameter ranging from about 0.5 to about 10 microns.

4. The fuel cell electrode structure of claim 1 wherein the substrate is derived from a noncarbonaceous solid material.

5. The fuel cell electrode structure of claim 1 wherein the substrate has opposing top and bottom surfaces, wherein the opposing top and bottom surfaces are positioned apart from each other a distance ranging from about 300 to about 500 microns.

6. The fuel cell electrode structure of claim 1 wherein the substrate consists essentially of silicon.

7. The fuel cell electrode structure of claim 1 wherein the substrate is derived from a silicon wafer.

8. The fuel cell electrode structure of claim 1 wherein the conformal electrically conductive film layer consists essentially of one or more atomic deposition layers, wherein the one or more atomic deposition layers are formed by an atomic layer deposition technique.

9. The fuel cell electrode structure of claim 1 wherein the conformal electrically conductive film layer includes a metal that consists essentially of one or more Platinum Group Metals.

10. The fuel cell electrode structure of claim 1 wherein the conformal electrically conductive film layer consists essentially of Ruthenium.

11. The fuel cell electrode structure of claim 1 wherein the conformal electrically conductive film layer is derived from a precursor selected from one or more of $Ru_3(CO)_{12}$, $Ru(C_{11}H_{19}O_2)_2(C_8H_{12})$, $Ru[(CH_3CH_2)C_5H_4]_2$, $Ru(OC_2H_5)_3$, $Ru(C_2H_5)(C_5H_5)_2$, $Ru(C_5H_5)_2$, $Ru(CH_3COCHCOCH_3)_3$, $Ru(C_{11}H_{19}O_2)_3$, and $RuCl_3$.

12. The fuel cell electrode structure of claim 1 wherein the conformal electrically conductive film layer has a thickness ranging from about 50 Å to about 2,500 Å.

13. The fuel cell electrode structure of claim 1 wherein the plurality of catalyst particles consists essentially of bi-metallic particles derived from platinum and ruthenium precursors.

* * * * *